UNITED STATES PATENT OFFICE.

WILLIAM AUGUSTUS HALL, OF NEW YORK, N. Y., ASSIGNOR TO WILLIAM A. HALL LUMBER & FIBRE COMPANY, A CORPORATION OF VERMONT.

ART OF FIREPROOFING WOOD.

1,076,762.  Specification of Letters Patent. Patented Oct. 28, 1913.

No Drawing.  Application filed November 15, 1910. Serial No. 592,591.

*To all whom it may concern:*

Be it known that I, WILLIAM A. HALL, a citizen of the United States, residing at New York, in the county of New York and State of New York, have invented or discovered certain new and useful Improvements in the Art of Fireproofing Wood, of which the following is a specification.

The object of this invention or discovery is to render wood efficiently fireproof without involving too much expense. To this end it has been discovered that a solution comprising, approximately, 12 parts of chlorid of potassium, 22 parts of sulfate of magnesium, 17 parts of chlorid of magnesium, and 27 parts of chlorid of sodium will, when forced into and throughout the wood, have a very efficient fireproofing effect. In making the solution sufficient water is employed to entirely dissolve the above-mentioned ingredients. By preference I use a solution containing about 21 pounds of the mixture to 100 pounds of water, thus making a solution of about 12° Baumé. Wood which has been impregnated with a solution of this composition efficiently meets most of the usual fire tests in a very satisfactory manner; although its capacity for meeting the flame test, or exposure to direct flame for a certain time, is greatly improved by adding to the solution of the ingredients above mentioned about ten parts of phosphate of ammonia.

In the fireproofing process, the wood to be fireproofed is impregnated or saturated with this new fireproofing composition in any well known manner by which the composition may be forced into and throughout the wood, as by immersing the wood in the fireproofing solution in the chamber of a closed cylinder or other receptacle, and then applying a high pressure to the chamber of the cylinder or receptacle.

Having thus described my invention or discovery I claim and desire to secure by Letters Patent:

1. A fireproofing composition comprising an aqueous solution of about 12 parts of chlorid of potassium, 22 parts sulfate of magnesium, 17 parts chlorid of magnesium, and 27 parts chlorid of sodium.

2. A fireproofing composition comprising an aqueous solution of about 12 parts of chlorid of potassium, 22 parts sulfate of magnesium, 17 parts chlorid of magnesium, 27 parts chlorid of sodium, and 10 parts of phosphate of ammonia.

In testimony whereof I affix my signature, in presence of two witnesses.

WILLIAM AUGUSTUS HALL.

Witnesses:
C. M. SWEENEY,
FRED A. KLINGE.